United States Patent
Batenburg (10) Patent No.: US 7,637,113 B2
(45) Date of Patent: Dec. 29, 2009

(54) APPARATUS AND METHOD FOR PUMPING A FLUID FROM A STORAGE VESSEL AND DETECTING WHEN THE STORAGE VESSEL IS EMPTY

(75) Inventor: Greg Batenburg, North Delta (CA)

(73) Assignee: Westport Power Inc., Vancouver, BC (CA)

(*) Notice: Subject to any disclaimer, the term of this patent is extended or adjusted under 35 U.S.C. 154(b) by 14 days.

(21) Appl. No.: 12/143,023

(22) Filed: Jun. 20, 2008

(65) Prior Publication Data
US 2008/0302109 A1 Dec. 11, 2008

Related U.S. Application Data

(63) Continuation of application No. PCT/CA2006/001961, filed on Nov. 29, 2006.

(30) Foreign Application Priority Data
Dec. 20, 2005 (CA) .................... 2527122

(51) Int. Cl.
- F17C 13/00 (2006.01)
- F17C 13/02 (2006.01)
- F04B 49/00 (2006.01)
- G01F 23/00 (2006.01)

(52) U.S. Cl. .............. 62/50.6; 417/211.5; 73/290 R; 62/49.2

(58) Field of Classification Search ............ 62/50.6, 62/49.2; 417/211.5, 63; 73/290 R
See application file for complete search history.

(56) References Cited

U.S. PATENT DOCUMENTS

| | | | |
|---|---|---|---|
| 3,582,236 A * | 6/1971 | Ungerer | 417/211.5 |
| 4,416,590 A | 11/1983 | Colucci | |
| 4,472,946 A | 9/1984 | Zwick | |
| 4,491,016 A * | 1/1985 | Haefner | 73/302 |
| 5,551,488 A * | 9/1996 | Gram | 141/18 |
| 6,272,923 B1 | 8/2001 | Stephan | |
| 2004/0055313 A1* | 3/2004 | Navedo et al. | 62/6 |
| 2004/0105759 A1* | 6/2004 | Gram et al. | 417/53 |

FOREIGN PATENT DOCUMENTS

| | | |
|---|---|---|
| JP | 4-256813 | 9/1992 |
| WO | 99/24714 | 5/1999 |
| WO | 02/31403 | 4/2002 |

* cited by examiner

Primary Examiner—William C Doerrler
(74) Attorney, Agent, or Firm—McAndrews, Held & Malloy, Ltd.

(57) ABSTRACT

An apparatus for delivering a process fluid comprises a storage vessel, a process pump for pumping the process fluid from the storage vessel, a hydraulic drive system comprising a hydraulic drive unit operatively connected to drive the process pump, a pressure sensor for measuring hydraulic fluid pressure of the pressurized hydraulic fluid in the hydraulic drive system, and, an electronic controller programmed to monitor a signal representative of hydraulic fluid pressure that is measured by the pressure sensor, process the signal to determine when the storage vessel is empty, and stop the process pump when the storage vessel is empty. The disclosed method relates to using the disclosed apparatus to measure hydraulic fluid pressure in the hydraulic drive system, process measured hydraulic fluid pressure to determine when the storage vessel is empty, and stop the process pump when the storage vessel is empty.

40 Claims, 8 Drawing Sheets

APPARATUS AND METHOD FOR PUMPING A FLUID FROM A STORAGE VESSEL AND DETECTING WHEN THE STORAGE VESSEL IS EMPTY

CROSS-REFERENCE TO RELATED APPLICATION(S)

This application is a continuation of International Application No. PCT/CA2006/001961, having an international filing date of Nov. 29, 2006, entitled "Apparatus And Method For Pumping A Fluid From A Storage Vessel And Detecting When The Storage Vessel Is Empty". The '961 international application claimed priority benefits, in turn, from Canadian Patent Application No. 2,527,122 filed Dec. 20, 2005. The '961 international application is hereby incorporated by reference herein in its entirety.

FIELD OF THE INVENTION

The present invention relates to an apparatus and method for pumping a fluid from a storage vessel and detecting when the storage vessel is empty.

BACKGROUND OF THE INVENTION

With some fluids there can be a problem with accurately detecting the level of fluid remaining in a storage vessel. When the fluid is being pumped from the storage vessel, if the pump is allowed to continue operating when the storage vessel is empty, this can result in accelerated wear and damage to pump components, such as seals.

For example, accurate level sensors are not available for measuring the level of a cryogenic fluid in a storage vessel. It is known to employ capacitance-type level sensors for measuring cryogenic fluid levels, but even when operating normally such sensors can be in error by as much as 20 to 25 percent, and periodic re-calibrated is needed or at least desirable to prevent drifts in accuracy. Mobile fuel tanks for vehicles can be a particularly challenging application for level sensors since the movement of the vehicle exerts inertial forces on the stored liquefied gas shifting its location inside the fuel tank. If the storage vessel is a fuel tank, such as one that holds liquefied natural gas for delivering fuel to an engine for a vehicle, the vehicle can be stranded if the fuel tank is emptied while the level sensor inaccurately shows that there is still fuel inside the fuel tank.

It can be desirable to store a gas in liquefied form at cryogenic temperatures to achieve a higher storage density, compared to the same gas stored in the gaseous phase. For example, higher storage density is desirable when the gas is employed as a fuel for a vehicle because the space available to store fuel on board a vehicle is normally limited.

The desired temperature for storing a liquefied gas depends upon the particular gas. For example, at atmospheric pressure, natural gas can be stored in liquefied form at a temperature of minus 160 degrees Celsius, and a lighter gas such as hydrogen can be stored at atmospheric pressure in liquefied form at a temperature of minus 253 degrees Celsius. As with any liquid, the boiling temperature for the liquefied gas can be raised by holding the liquefied gas at a higher pressure. The term "cryogenic temperature" is used herein to describe temperatures less than minus 100 degrees Celsius, at which a given gas can be stored in liquefied form at pressures less than 2 MPa (about 300 psig). To hold a liquefied gas at cryogenic temperatures, the storage vessel defines a thermally insulated cryogen space. Storage vessels for holding liquefied gases are known and a number of methods and associated apparatuses have been developed for removing liquefied gas from such storage vessels. The term "cryogenic fluid" is used herein to describe a fluid that is at a cryogenic temperature.

Accordingly, for some fluids, such as liquefied gases stored at cryogenic temperatures, until a more accurate and reliable level sensor is developed and commercialized, there is a need for an apparatus and method for pumping the stored fluid from a storage vessel and detecting when the storage vessel is nearly empty or actually empty.

SUMMARY OF THE INVENTION

An apparatus for delivering a process fluid comprises:
(a) a storage vessel defining a storage space for storing the process fluid;
(b) a process pump with a suction inlet in communication with the storage space;
(c) a hydraulic drive system comprising a hydraulic drive unit operatively connected to drive the process pump and conduits for circulating and draining a pressurized hydraulic fluid to and from the hydraulic drive unit
(d) a pressure sensor for measuring hydraulic fluid pressure of the pressurized hydraulic fluid in the hydraulic drive system; and
(e) an electronic controller programmed to:
  (i) monitor a signal representative of hydraulic fluid pressure that is measured by the pressure sensor;
  (ii) process the signal to determine when the storage vessel is empty; and
  (iii) stop the process pump when the storage vessel is empty.

In a preferred embodiment, the storage space is thermally insulated to define a cryogen space that can store the process fluid at a cryogenic temperature. This is a particularly useful application of the disclosed apparatus because accurate, reliable and inexpensive level sensors have not been developed for cryogenic fluids stored in a thermally insulated storage vessel, especially when the storage vessel is a mobile unit and transportation of the storage vessel results in movement of the cryogenic fluid inside the storage vessel.

The process pump is preferably a positive displacement pump, and more specifically, a pump that comprises a piston that is reciprocable to pump the process fluid. The process pumps can comprise single-acting or double-acting pistons that are reciprocable within a pump chamber to pump the process fluid.

In a preferred embodiment, for each cycle of the process pump, the electronic controller is programmable to process the measured hydraulic fluid pressure to determine a peak hydraulic fluid pressure, to compare the measured peak hydraulic fluid pressure to a predetermined value, to count the number of process pump cycles (n) when the measured peak hydraulic fluid pressure is less than the predetermined value, and to determine that the storage vessel is empty when n equals a predetermined number ($n_e$).

The apparatus can further comprising a signaling device operable by the electronic controller to warn an operator of the apparatus when the electronic controller determines that process fluid level inside the storage vessel could be low. For example, the electronic controller can be programmable to determine that process fluid level inside the storage vessel could be low when the measured peak hydraulic fluid pressure is less than the predetermined value and n is greater than zero and less than $n_e$. That is, by giving the operator an early warning when the level in the storage vessel could be low, allows the operator to take note of it and plan for re-filling the storage vessel.

In another embodiment of the apparatus, for each cycle of the process pump, the electronic controller is programmable to calculate an area beneath a plot of hydraulic fluid pressure measurements over time, to count the number of process pump cycles (n) when the area is calculated to be less than a predetermined value, and to determine that the storage vessel is empty when n equals a predetermined number ($n_e$). With this embodiment, the electronic controller can be programmable to determine that process fluid level inside the storage vessel could be low when the area is calculated to be less than the predetermined value and n is greater than zero and less than $n_e$.

The storage vessel can be one of a plurality of storage vessels, further comprising piping that connects the suction inlet of the process pump with each one of the plurality of storage vessels, and at least one valve associated with the piping that is operable to select one of the storage vessels to be in fluid communication with the suction inlet of the process pump, and to stop communication with each one of the plurality of storage vessels when the controller determines that it is empty.

Instead of a pump that is in communication with a plurality of storage vessels, in another embodiment there can be a plurality of storage vessels, with each one of the storage vessels being associated with a suction inlet of its own process pump. The respective suction inlets can be disposed in respective storage spaces and respective hydraulic drive units operable to drive each one of the process pumps, wherein the electronic controller monitors peak hydraulic fluid pressure for each one of the hydraulic drive units, and the electronic controller is programmable to shut down each and every one of the process pumps if its associated storage vessel is determined to be empty. In this embodiment, the hydraulic drive system preferably comprises a hydraulic pump that is connectable by supply conduits to each one of the hydraulic drive units for the plurality of process pumps. The pressure sensor can be disposed in a conduit between a hydraulic fluid discharge of the hydraulic pump and a first switching valve for diverting flow to and from one of the plurality of hydraulic drive units for respective ones of the process pumps.

In another preferred embodiment of the apparatus, the storage vessel is one of two storage vessels, and each one of the storage vessels has a process pump with a suction inlet disposed in their respective storage spaces and a respective hydraulic drive unit operable to drive each of the process pumps, wherein the electronic controller monitors peak hydraulic fluid pressure for each one of the hydraulic drive units, and the electronic controller is programmable to shut down either one or both of the process pumps if the electronic controller determines that the storage vessel associated with the process pump is empty. So that only one pressure sensor is required to monitor both storage vessels, the pressure sensor is preferably disposed in a conduit between a hydraulic fluid discharge of the hydraulic pump and a switching valve for diverting hydraulic fluid flow to and from the hydraulic drive units for the two process pumps.

In a preferred embodiment of the apparatus, the storage vessel is a fuel tank on board a vehicle that stores a fuel that is consumable by the vehicle's engine. When the process fluid is fuel stored at a cryogenic temperature, the process fluid preferably comprises at least one of methane and hydrogen, since these fuels are cleaner burning than conventional diesel fuels, and they can burned by an engine to provide the requisite energy to allow the engine to at least match the performance of the same engine burning a conventional diesel fuel.

In a preferred embodiment of the apparatus, the process pump is disposed in the storage space and is connected by a drive shaft to the hydraulic drive unit, which is located outside of the storage space. This is advantageous for process fluids stored at a cryogenic temperature because locating the hydraulic drive unit outside the cryogen space reduces heat leak into the cryogen space, and the drive shaft can be elongated provide a longer heat transfer path from outside the cryogen space to the pump that is located inside the cryogen space.

A method of detecting when a storage vessel for a process fluid is empty comprises:
(a) storing the process fluid inside a storage space defined by the storage vessel;
(b) pumping the process fluid from the storage space with a process pump driven by a hydraulic drive system that delivers a pressurized hydraulic fluid to a hydraulic drive unit from a hydraulic pump;
(c) measuring hydraulic fluid pressure in the hydraulic drive system;
(d) processing measured hydraulic fluid pressure to determine when the storage vessel is empty; and
(e) stopping the process pump when the storage vessel is empty.

The preferred method of determining that the storage vessel is empty comprises detecting a peak hydraulic fluid pressure from the measured hydraulic fluid pressure for each process pump cycle and determining when it is less than a predetermined value, which is less than a predetermined normal peak hydraulic fluid pressure.

The method can further comprise filtering from determination of the peak hydraulic fluid pressure, hydraulic fluid pressure measurements from the first part of each stroke of a hydraulic piston of the hydraulic drive unit. This prevents errors in the identification of the peak hydraulic fluid pressure that might be caused by transient hydraulic fluid pressure effects associated with the hydraulic piston reversing direction.

The method can further comprise counting the number of process pump cycles (n) that the peak hydraulic fluid pressure is less than the predetermined value and determining that the storage vessel is empty when a predetermined number of process pump cycles ($n_e$) are counted. If n is positive, the method can further comprise subtracting one from n for each subsequent process pump cycle in which peak hydraulic fluid pressure is greater than the predetermined value. The method can further comprise sending a warning signal to an operator of the process pump when n is greater than zero and less than $n_e$. The method can also further comprise sending a signal to an operator of the process pump indicating that the storage vessel is empty when n equals $n_e$.

In another embodiment of the method, the method of determining that the storage vessel is empty comprises calculating an area beneath a plot of hydraulic fluid pressure measurements over time and determining when the calculated area is less than a predetermined value, which is less than a predetermined normal area. With this embodiment the method can further comprise counting the number of process pump cycles (n) that the calculated area is less than the predetermined value and determining that the storage vessel is empty when a predetermined number of process pump cycles ($n_e$) are counted. Like in the preferred method, if n is positive, the method can further comprise subtracting one from n for each subsequent process pump cycle in which the calculated area is greater than the predetermined value.

In a preferred method, the storage vessel is one of a plurality of storage vessels and the method further comprises ceasing to pump process fluid from one of the plurality of storage vessels when it is determined to be empty, and pumping the process fluid from another one of the plurality of storage vessels until each one of the plurality of storage vessels is determined to be empty.

In an embodiment of the method wherein there are a plurality of storage vessels, the method preferably further comprises counting for each of the plurality of storage vessels the number of process pump cycles (n) that a respective peak hydraulic fluid pressure determined from the measured hydraulic fluid pressure, is less than a predetermined value, and determining that each one of the storage vessels is empty when n for a respective storage vessel equals a predetermined number of process pump cycles ($n_e$). That is, the method comprises maintaining a separate count of n for each one of the plurality of storage vessels.

Like in the method that can be applied to a single storage vessel, for an apparatus with a plurality of storage vessels, another embodiment of the method can comprise counting for each of the plurality of storage vessels the number of process pump cycles (n) that a respective calculated area beneath a plot of hydraulic fluid pressure measurements over time is less than a predetermined value, and determining that each one of the storage vessels is empty when n for a respective storage vessel equals a predetermined number of process pump cycles ($n_e$).

The method of processing hydraulic fluid pressure to determine when the storage vessel is empty further comprises detecting a beginning or end of a process pump cycle to separate the measured hydraulic fluid pressure into discrete measurements for respective process pump cycles. The method can further comprise processing the measured hydraulic fluid pressure, and detecting the beginning or end of a process pump cycle by recognizing characteristic features in a pattern of hydraulic fluid pressure measurements that are associated with the beginning or end of a process pump cycle. In another embodiment, the method of detecting a beginning or end of a process pump cycle comprises processing a signal from a position sensor associated with the hydraulic drive unit or a drive shaft between the hydraulic drive unit and the process pump, and using the detected beginning or end to separate the measured hydraulic fluid pressure into discrete measurements for respective process pump cycles. In yet another embodiment, the method of detecting a beginning of a process pump cycle comprises detecting when a hydraulic fluid flow-switching valve is actuated to reverse the direction of hydraulic fluid flow through a hydraulic drive unit.

In a preferred embodiment of the method, the process fluid is a gas at ambient temperature and pressures and is stored inside the storage space in the form of a liquefied gas. To store the fluid in the form of a liquefied gas, the process fluid is preferably stored inside the storage space at a cryogenic temperature.

DETAILED DESCRIPTION OF PREFERRED EMBODIMENT(S)

With reference to the figures, like-named components with like reference numbers separated by multiples of one hundred refer to like components in different embodiments. Because a particularly useful application for the disclosed apparatus and method is pumping a liquefied gas stored at a cryogenic temperature from a cryogenic storage vessel, this example is used to describe the preferred embodiments illustrated by the figures. However, persons familiar with the technology involved here will understand that the disclosed apparatus and method can be applied to pumping other fluids that need not be stored at cryogenic temperatures, such as, for example, propane.

Figure 1:
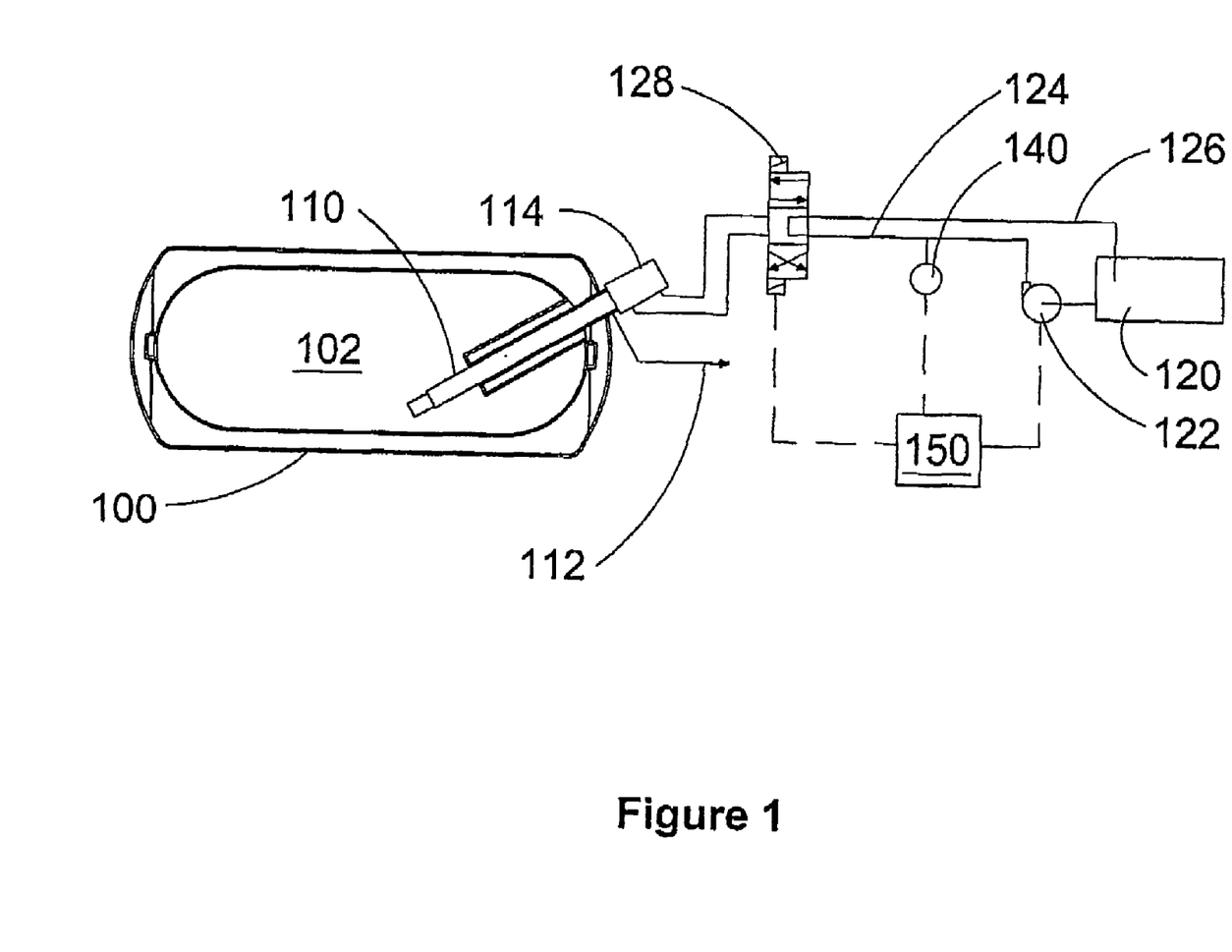
FIG. 1 is a schematic diagram of a storage vessel with an internal pump, a hydraulic drive, a hydraulic fluid pressure sensor, and an electronic controller.

FIG. 1 is a schematic view of an apparatus for pumping a cryogenic fluid from storage vessel 100 that defines thermally insulated cryogen space 102. In this illustrated embodiment cryogenic pump 110 is disposed within cryogen space 102. In a preferred embodiment, cryogenic pump 110 is a positive displacement pump such as one that employs a reciprocating piston to pump the cryogenic fluid. Cryogenic pump 110 can employ a single-acting piston or a double acting piston. Cryogenic fluid pumped from cryogen space 102 is delivered to conduit 112 by cryogenic pump 110.

A drive shaft operatively connects cryogenic pump 110 to hydraulic drive unit 114, which in the illustrated embodiment is located outside of the cryogen space. In the preferred embodiment, hydraulic drive unit 114 comprises a hydraulically driven piston that reciprocates by directing pressurized hydraulic fluid to opposite sides of the piston in alternating fashion. Such hydraulic drive units for producing linear reciprocating motion are well known. That is, a hydraulic fluid chamber associated with one side of the hydraulically driven piston is filled with pressurized hydraulic fluid from high-pressure conduit 124, while a hydraulic fluid chamber associated with the opposite side of the hydraulic piston communicates with drain line 126 that returns hydraulic fluid to the hydraulic pump 122 or a hydraulic fluid reservoir 120. The hydraulic drive system comprises one or more valves that are operable when the hydraulically driven piston completes its stroke, so that by operation of the valve(s) the hydraulic fluid chamber previously in communication with drain line 126 is in communication with high-pressure conduit 124 that supplies the pressurized hydraulic fluid and the other hydraulic fluid chamber is in communication with drain line 126. Upon actuating the valves at the end of a piston stroke, and switching the hydraulic fluid connections to the hydraulic fluid chambers, the pressurized hydraulic fluid acts on the hydraulic piston to reverse the direction of linear movement. In a preferred embodiment the hydraulic fluid valve can be schematically illustrated valve 128, which comprises an electronically actuated block with ports for switching the flow from high-pressure conduit 124 from one hydraulic fluid chamber to the other at the same time that the opposite hydraulic fluid chamber is connected to drain line 126. The valve block can also include ports (shown schematically in the middle of the valve block in FIG. 1) for re-circulating the hydraulic fluid without driving hydraulic drive unit 114. This feature can be employed, for example when hydraulic pump 122 is mechanically driven by an engine and hydraulic pump 122 is continuously operated when the engine is running, even when cryogenic pump 110 is idle.

Pressure sensor 140 preferably has its sensor disposed in high-pressure conduit 124 between the hydraulic fluid discharge outlet of hydraulic pump 122 and hydraulic drive unit 114. More precisely, pressure sensor 140 is preferably downstream from hydraulic pump 122 and upstream from valve 128 because downstream from valve 128, during operation of hydraulic drive unit 114, the conduits alternate between pressure and drain functions. According to the presently disclosed apparatus and method, pressure sensor 140 is intended to measure hydraulic fluid pressure that correlates to the hydraulic fluid pressure in the drive chamber of hydraulic drive unit 114 that is filled with pressurized hydraulic fluid. If the pump is a single-acting pump, because only one hydraulic fluid chamber is associated with the pumping stroke (that is, the "drive chamber"), the pressure sensor can be located downstream from valve 128 or inside hydraulic drive unit 114 if the pressure sensor is associated with the drive chamber. Accordingly, in some embodiments, the pressure sensor can be located inside the hydraulic drive unit or in piping upstream from the hydraulic drive unit, in a location where the pressure sensor can be conveniently installed and serviced.

Pressure sensor 140 communicates with electronic controller 150 to communicate the measured hydraulic fluid pressure. Responsive to the measured hydraulic fluid pressure, electronic controller 150 can stop cryogenic pump 110 by communicating with at least one of hydraulic pump 122 and valve 128, which controls the by-pass feature.

Figure 2:
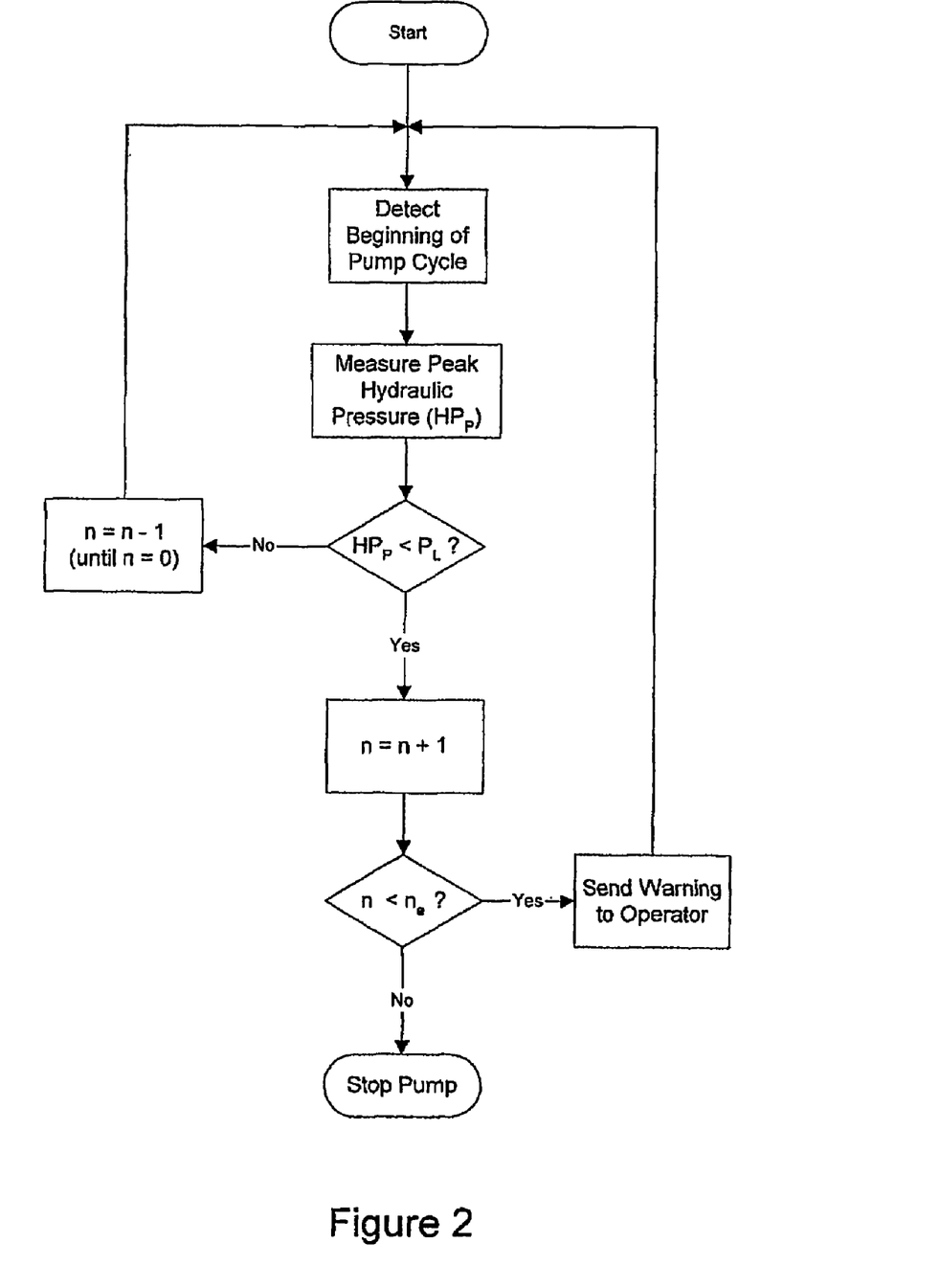
FIG. 2 is a flow diagram that illustrates a method for operating the pump and detecting when the storage vessel is empty.

A method of operating the embodiment of FIG. 1 is described with reference to the flow diagram of FIG. 2, which represents the control strategy that electronic controller 150 can be programmed to follow. The apparatus of FIG. 1 is a part of a larger system that includes an end user of the cryogenic fluid, which can be described generically as the process fluid. For example, if the end user is an engine, the process fluid can be a fuel that is delivered to the engine where it is burned to produce power. In another example, the apparatus of FIG. 1 can be used to fill smaller storage vessels for distribution of the cryogenic fluid, which can be a liquefied gas. In addition to the control strategy disclosed herein, electronic controller 150 receives inputs from the larger system that it is a part of, for example, to determine when to switch the pump on or off as a function of the needs of the larger system. Using the aforementioned examples, if the larger system comprises an engine and the process fluid is fuel that is consumed by the engine, the cryogenic pump can be switched on and off to maintain fuel pressure within a predetermined operating range. If the larger system is an apparatus that is used to fill smaller storage vessels, additional inputs can comprise indicators that signal when the storage vessel that is being filled is full. Accordingly, the illustrated control strategy is part of a larger control strategy, with the disclosed method being employed at times when the cryogenic pump is already commanded to operate, to determine when the storage vessel is empty and when to stop the cryogenic pump.

As shown in the flow diagram, each discrete cryogenic pump cycle is detected. Position sensors can be employed to detect when a hydraulic piston is at the beginning or end of a piston stroke, or electronic controller 150 can be programmed to recognize a pattern in pressure measurements generated from the measured hydraulic fluid pressure. The actuation of valve 128 can also be used as an indicator for detecting discrete cryogenic pump cycles, since actuation of valve 128 to switch the direction of hydraulic fluid flow indicates a change in direction of the hydraulic piston. It is also possible to estimate the position of the hydraulic piston by calculating the position as a function of a known volumetric flow rate of hydraulic fluid that is pumped from hydraulic pump 122 into a known hydraulic piston displacement volume and the timing for the beginning of each cryogenic pump cycle determined from the timing for actuating valve 128.

By detecting discrete pump cycles, the peak hydraulic pressure (HPp) for each cryogenic pump cycle can be identified and compared against a predetermined value ($P_L$). Predetermined value $P_L$ is less than the normal peak hydraulic fluid pressure that occurs when the storage vessel is full or when the cryogenic pump chamber is fully charged with cryogenic fluid at the end of the intake stroke. Electronic controller 150 can also be programmed to filter out the hydraulic fluid pressure measurements associated with when the cryogenic pump piston is reversing direction, since there can be "noise" in the hydraulic system pressure measurements when this occurs. For example, for the purpose of identifying peak hydraulic pressure HPp, electronic controller 150 can be programmed to ignore the pressure measured during the first 25% of a pumping stroke.

In the embodiments of the apparatus, the cryogenic pump can be a single-acting or double acting pump. With a single-acting pump there is one peak hydraulic fluid pressure measurement in the hydraulic system for each cryogenic pump cycle. With a double-acting pump there is typically a dominant piston direction with a higher mass flow rate, and a lower mass flow rate associated with when the cryogenic pump piston moves in the opposite direction. For a double-acting pump, peak hydraulic fluid pressure is defined as the peak hydraulic system pressure associated with when the cryogenic pump piston is moving in the dominant piston direction. Accordingly, the electronic controller can be programmed to recognize when the cryogenic pump piston is moving in the dominant piston direction, and to measure peak hydraulic fluid pressure during that piston stroke.

As the cryogenic pump is operated, the level of cryogenic fluid inside the storage vessel is drawn down, and when the level is low, the cryogenic pump chamber may not be completely filled with cryogenic fluid during each intake stroke. If the cryogenic pump chamber is not fully charged, the less it is filled, the lower the peak hydraulic fluid pressure. $P_L$ is a predetermined value that can be, for example, between 10% and 50% lower than the normal peak hydraulic fluid pressure measured when the pump is fully charged.

If the measured peak hydraulic fluid pressure HPp is less than $P_L$, then this is an indication that the storage vessel could be empty or that the cryogenic fluid level is getting low and the electronic controller activates a counter to track the number of pump cycles (n) in which HPp is less than $P_L$—However, after the first pump cycle in which HPp is measured to be less than $P_L$, even if $P_L$ is 40% to 50% lower than the normal peal hydraulic fluid pressure, there could still be enough cryogenic fluid remaining in the storage vessel to safely continue operating the cryogenic pump for a predetermined number of cryogenic pump cycles. Factors such as "noise" in the pressure measurement signal or inertial forces acting on the cryogenic fluid that can prevent a fully charged pump chamber in the case of a mobile storage vessel, could also result in HPp being lower than $P_L$ resulting in a false indication that the cryogenic fluid level is low. Accordingly, to filter out false indications, and to allow more of the cryogenic fluid to be pumped before the storage vessel is determined to be empty, the control strategy can allow the cryogenic pump to continue operating as long as counter number n is less than predetermined value $n_e$. If n is greater than zero and less than $n_e$ then the method can optionally include sending a warning to the operator that the cryogenic fluid level may be getting low. If the cryogenic fluid is fuel and the end user for the fuel is an engine for a vehicle, pressurized fuel supply systems typically comprise an accumulator vessel for delivering fuel at a consistent pressure. After the warning is signaled to the operator, the accumulator provides enough fuel for the engine to operate for a short time, allowing the vehicle to be driven to a safe place to stop if the operator acts on the warning. The disclosed apparatus and method can be used in combination with other devices and methods such as a level sensor and computed fuel consumption and range to help the operator to decide whether immediate action is needed or at least desirable in response to a low level warning. While the level sensor, the computed fuel consumption and range, and the warning derived from a low peak hydraulic fluid pressure are each by themselves not precise in indicating the actual fluid level in the storage vessel, collectively, these indicators provide an operator with better guidance on when the storage vessel should be re-filled.

As long as n is less than $n_e$, the cryogenic pump can continue to operate, with the control loop repeating to detect the next cryogenic pump cycle, measure HPp and compare it to $P_L$. If in subsequent cryogenic pump cycles HPp is not less than $P_L$, then for each cryogenic pump cycle that HPp is not less than $P_L$, then the counter can be programmed to subtract one from n until n=0. This allows false indications to be cancelled out by later cryogenic pump cycles. If counter number n equals predetermined number $n_e$, then electronic controller 150 determines that storage vessel 100 is empty and cryogenic pump 110 is commanded to stop.

Figure 3:
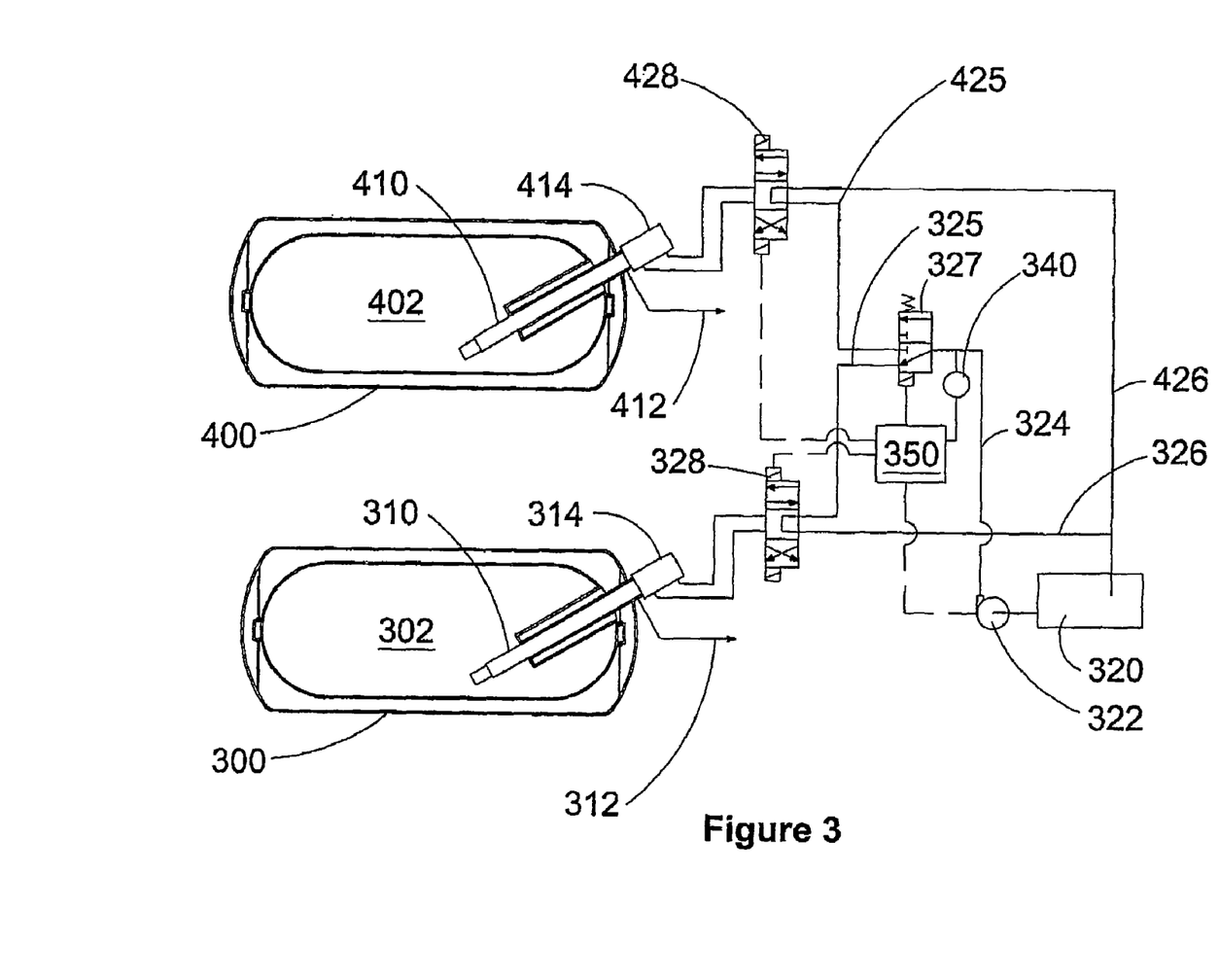
FIG. 3 is a schematic diagram of a system with two storage vessels, each with an internal pump and a hydraulic drive, and hydraulic fluid pressure sensor and an electronic controller.

FIG. 3 is a schematic of a multi-storage vessel embodiment. This embodiment is much like the embodiment of FIG. 1, except that there are two storage vessels 300, 400, with each one defining its own cryogen space 302, 402. Each storage vessel has a respective cryogenic pump 310, 410, which delivers cryogenic fluid to respective conduits 312, 412. The hydraulic drive system comprises hydraulic pump 322 which delivers pressurized hydraulic fluid from reservoir 320 through high pressure conduits 324, 325, and 425, and valves 327, 328 and 428 to one of separate hydraulic drive units 314, 414 for driving respective cryogenic pumps 310, 410. Hydraulic fluid is drained from hydraulic drive units 314 and 414 back to reservoir 320 through drain lines 326 and 426. Pressure sensor 340 is positioned on high-pressure conduit 324 to measure hydraulic fluid pressure. Only one pressure sensor is needed if positioned between hydraulic pump 322 and valve 327 since high-pressure conduit 324 supplies pressurized hydraulic fluid to both hydraulic drive unit 314 and 414. Electronic controller 350 receives inputs from pressure sensor 340 and processes the input signal to detect the peak hydraulic fluid pressure for each cryogenic pump cycle. Electronic controller 350 knows from the commanded position of selector valve 325 which one of cryogenic pumps 310 and 410 is being operated to pump cryogenic fluid, and associates the measured peak hydraulic pressure with that cryogenic pump.

Electronic controller 350 is programmable to command operation of valves 325, 328 and 428, and optionally hydraulic pump 322. In some embodiments, there is no need to control the operation of hydraulic pump 322 if it is allowed to operate continuously, for example, if hydraulic pump 322 is mechanically driven by an engine, and the hydraulic system also supplies high pressure hydraulic fluid to other users. If hydraulic pump 322 operates continuously, cryogenic pumps 310 and 410 can be stopped by selecting the shown middle positions for valves 328 and 428, in which the pressurized hydraulic fluid by-passes hydraulic drive units 314 and 414.

Figure 4:
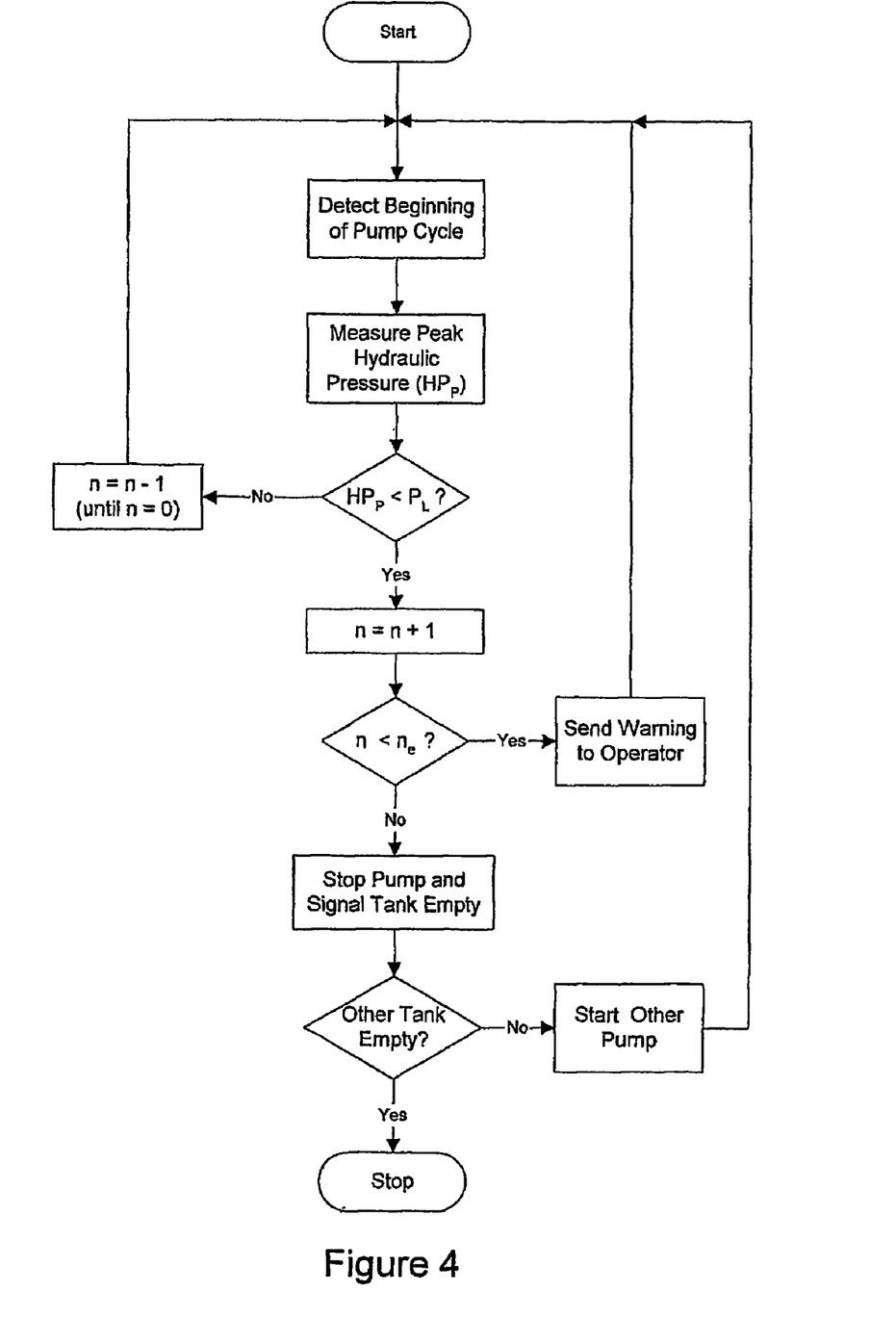
FIG. 4 is a flow diagram that illustrates a method of operating the system of FIG. 3.

Apart from there being two storage vessels and two cryogenic pumps arranged in parallel, the method of operating the apparatus of FIG. 3 is much the same as the method of operating the apparatus of FIG. 1. FIG. 4 illustrates a preferred method of operating the apparatus of FIG. 3 to detect when one of storage vessels 300 or 400 is empty. The control loop for detecting discrete pump cycles, measuring peak hydraulic pressure HPp and comparing HPp to $P_L$ is the same as the method illustrated in FIG. 2 for operating the apparatus of FIG. 1. Also the same is the method of counting the number of cryogenic pump cycles in which HPp is less than $P_L$, checking if n is less than $n_e$, sending a warning to the operator if n is greater than zero and less than $n_e$, and reducing the count for n by one each time HPp is not less than $P_L$ in a subsequent cryogenic pump cycle. The extra feature of embodiments that comprise a plurality of storage vessels is that when a pump is stopped because a storage vessel is empty, if one of the other storage vessels is not empty, another pump can be started and operated until the storage tank it is associated with is empty.

Figure 5:
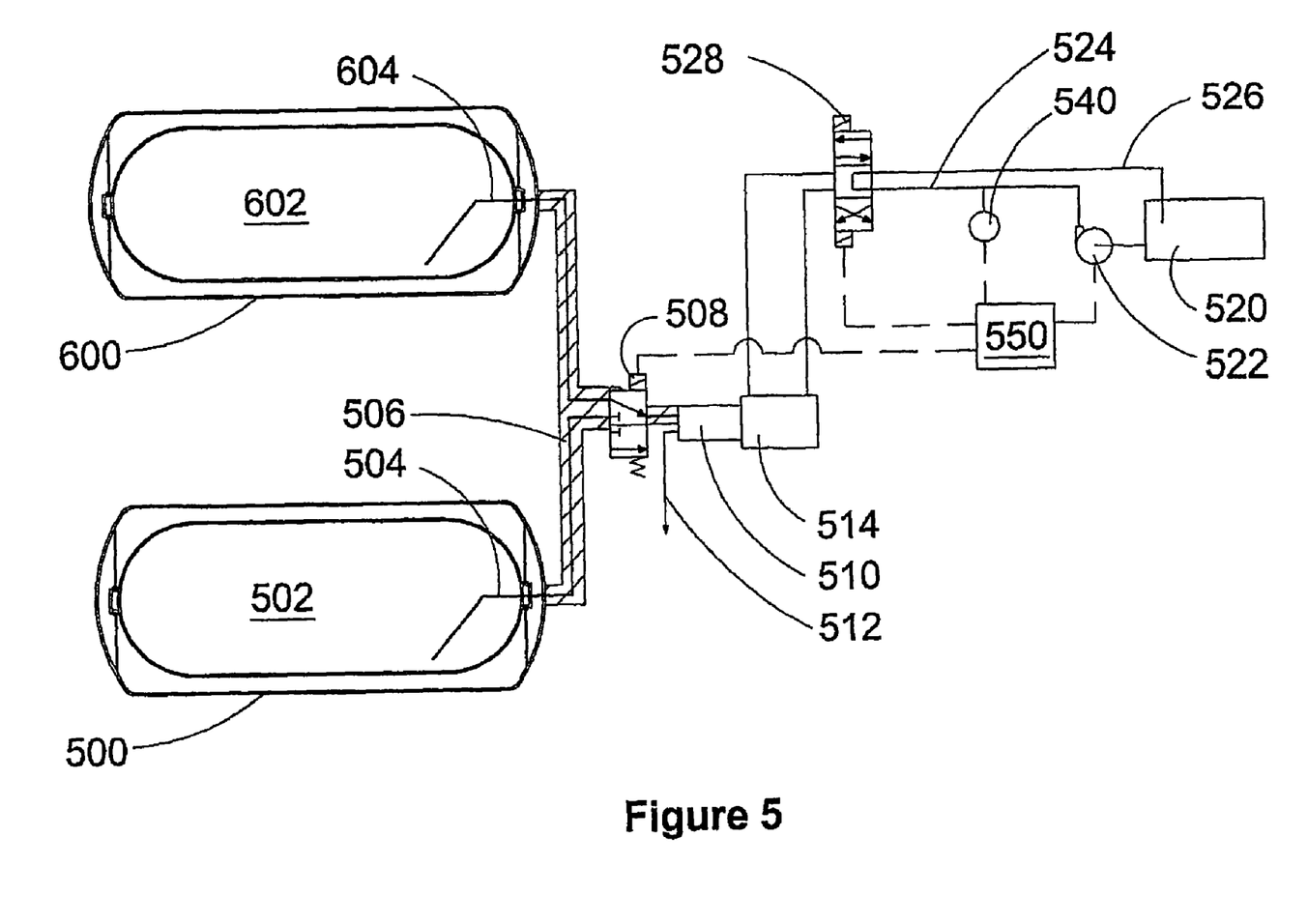
FIG. 5 is a schematic diagram of a system with two storage vessels and an external pump in communication with the respective storage spaces of the two storage vessels, a hydraulic drive, a hydraulic fluid pressure sensor, and an electronic controller.

FIG. 5 is a schematic view of a different embodiment of a multi-storage vessel arrangement, which comprises pressure sensor 540 for measuring the pressure of the hydraulic fluid in high-pressure conduit 524 so that the disclosed method can be employed to determine when one of a plurality of storage vessels is empty. While FIG. 5 only shows two storage vessels to illustrate this embodiment, it is understood by persons familiar with the technology involved here that the apparatus can comprise a greater number of storage vessels and function in substantially the same manner. The apparatus of FIG. 5 is different from the apparatus of FIG. 3 in that cryogenic pump 510 is disposed outside of cryogen spaces 502 and 602, and conduits 504 and 604 which supply cryogenic fluid to the inlet of cryogenic pump 510, are surrounded by thermal insulation 506 to keep the cryogenic fluid at cryogenic temperatures until it is delivered to cryogenic pump 510. Valve 508 selects the storage vessel that is in fluid communication with cryogenic pump 510, and valve 508, like conduits 504 and 604 is preferably thermally insulated (in the simplified illustration of this embodiment, thermal insulation is not shown around valve 508 in FIG. 5). Cryogenic fluid is discharged from cryogenic pump 510 into conduit 512.

Because the multi-storage vessel arrangement of FIG. 5 can employ only one cryogenic pump, the arrangement for the hydraulic drive system, comprising reservoir 520, hydraulic pump 522, high pressure conduit 524, drain line 526, and the manner in which these conduits are connected to hydraulic drive unit 514 through valve 528 is substantially the same as the arrangement of like-numbered elements of FIG. 1. Electronic control unit 550 receives measurements of hydraulic fluid pressure from pressure sensor 540 and sends command signals to valves 508 and 528, and optionally hydraulic pump 522.

Although FIG. 5 shows an arrangement with two storage vessels and one cryogenic pump, it is understood that in other embodiments, similar to the embodiment of FIG. 3, more than one cryogenic pump can be employed, but with cryogenic pumps that are disposed outside of the cryogen space like the one shown in FIG. 5. While there are a number of advantages associated with locating the pump inside the storage vessel, such configurations add to the manufacturing cost of such storage vessels, compared to storage vessels that are not required to accommodate an internal cryogenic pump. With an internal cryogenic pump disposed within the cryogen space of a storage vessel, a cryogenic pump is needed for each storage vessel in a multi-storage vessel system. An internal cryogenic pump can also be more difficult to service. On the other hand, a challenge for external pumps is providing sufficient thermal insulation for the conduit between the storage vessel(s) and the cryogenic pump, and for the cryogenic pump itself. External pumps typically require a cool-down procedure upon start up, before the pump can perform normally. Accordingly, there are advantages and disadvantages associated with both arrangements, for cryogenic pumps disposed within the cryogen space of the storage vessels and for cryogenic pumps located outside the cryogen spaces. As shown by the illustrated embodiments, irrespective of whether the cryogenic pump(s) are located inside or outside the cryogen space defined by the storage vessel(s), the disclosed apparatus and method for measuring peak hydraulic fluid pressure and determining when a storage vessel is empty can be applied.

Arrangements with more than one cryogenic pump provide a more robust system. Pump performance can degrade over time, for example because of worn seals. A multi-pump arrangement can provide redundancy and extra pumping capacity that can provide the durability and dependability that is required in a commercial product. In embodiments with external cryogenic pumps, it can also allow a modular system that can be expanded to adapt to the requirements of a particular application, without requiring the number of cryogenic pumps to match the number of storage vessels. That is, rather than requiring the design of different sized cryogenic pumps, adding to development, manufacturing, and inventory costs, a cryogenic pump of one size can be developed, with only the number of pumps changing depending upon the needed or desired low capacity.

Figure 6:
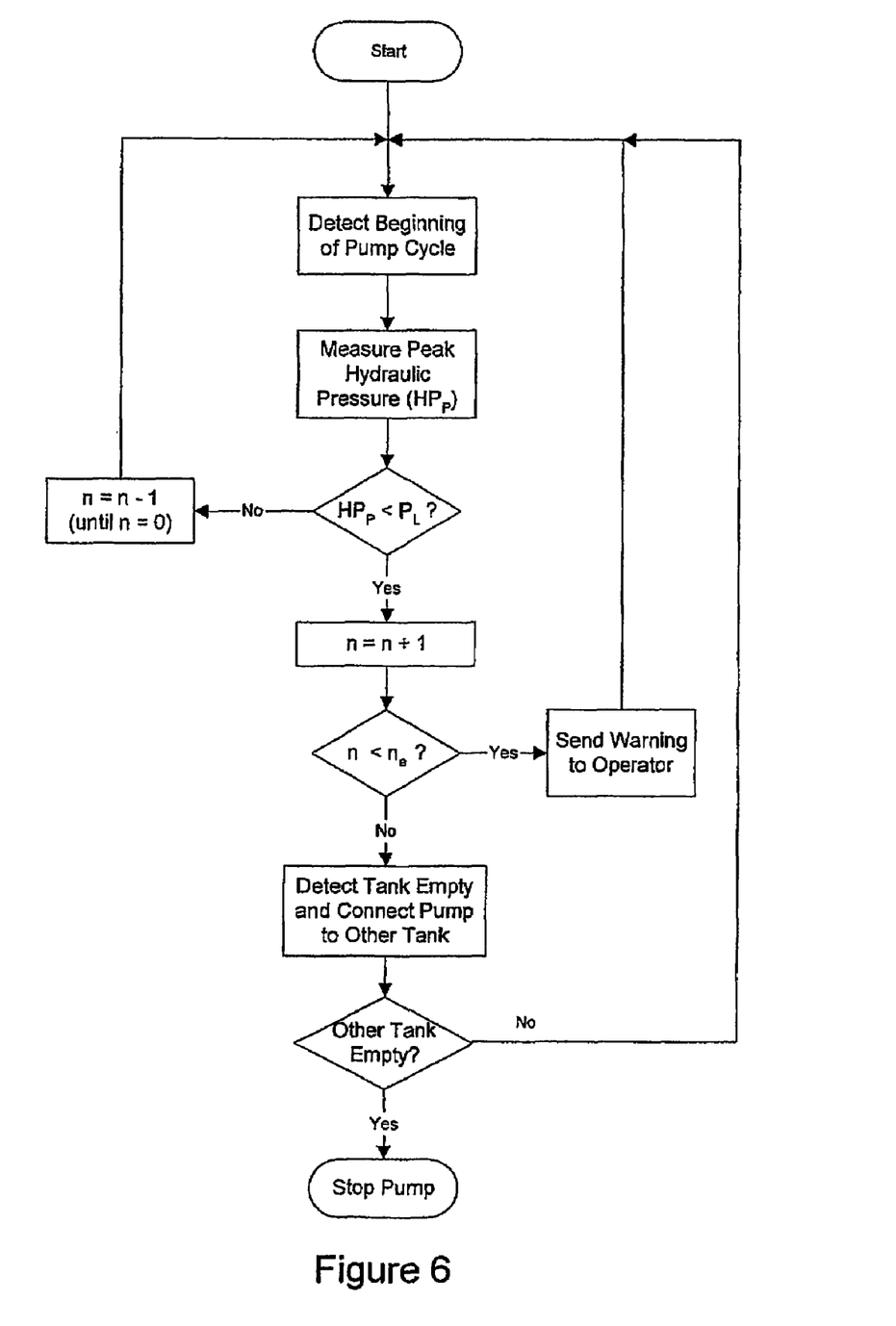
FIG. 6 is a flow diagram that illustrates a method of operating the system of FIG. 5.

As shown by FIG. 6, for the arrangement of FIG. 5, the method for detecting when one of the storage vessels is empty is the same as the method employed by the other embodiments. The difference with the method illustrated by FIG. 6 is that when it is determined that one of the storage tanks is empty, instead stopping cryogenic pump 510, if one of the other storage vessels is not empty, valve 508 can be actuated to connect cryogenic pump 510 to that storage vessel and cryogenic pump 510 can continue to operate. Cryogenic pump 519 is not commanded to stop until the storage vessels are empty or until the end user does not require further cryogenic fluid to be pumped. Although not shown in the flow diagram of FIG. 6, the method can further comprise electronic controller 550 indicating to an operator of the apparatus that a particular one of the storage vessels is empty when it detects that it is empty.

Figure 7:
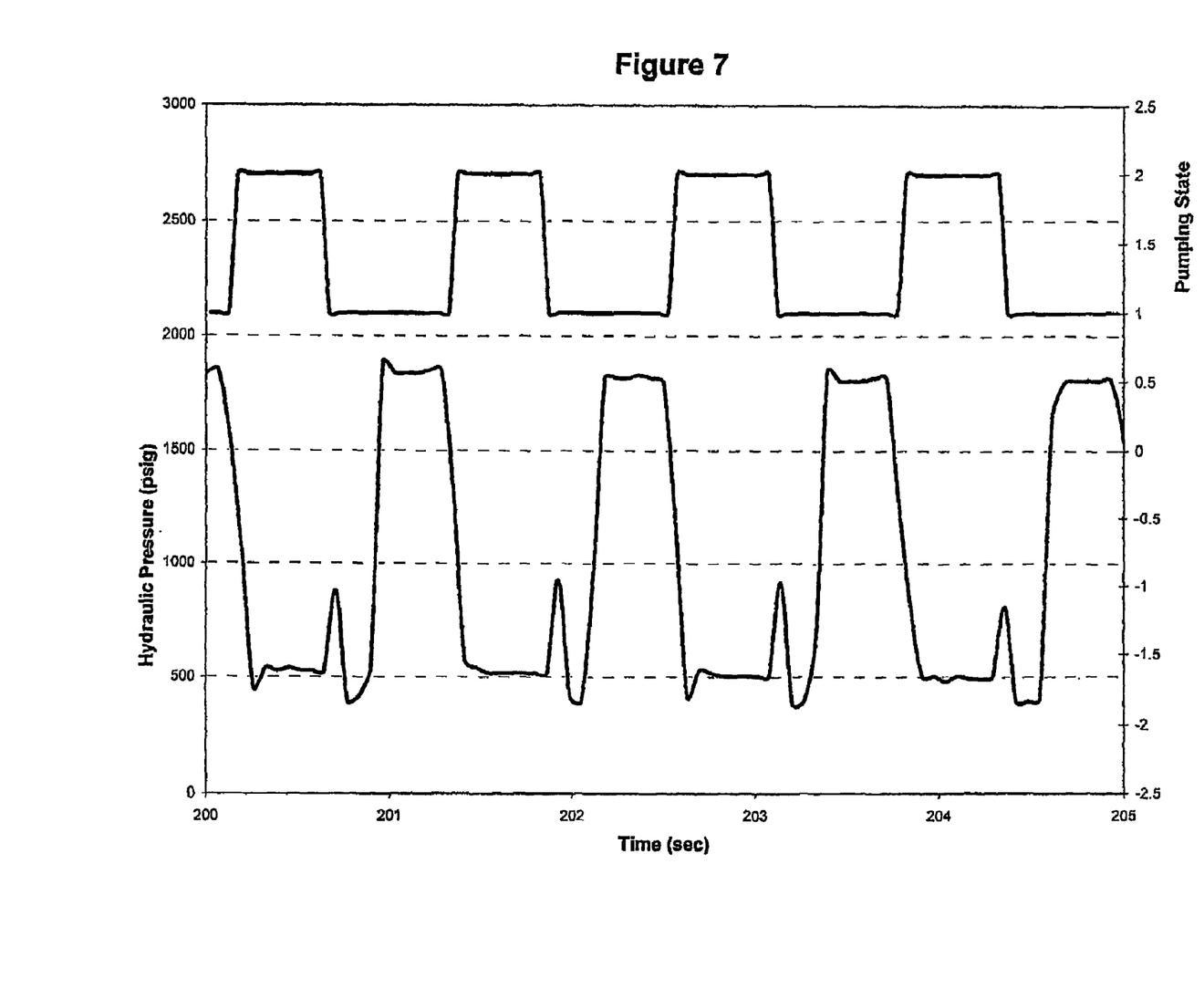
FIG. 7 is a graph that plots the normal pattern of hydraulic fluid pressure measurements and pump piston displacement over time for a pump that is pumping a fluid from a storage vessel.

FIG. 7 is a graph of hydraulic system pressure plotted over time. Also plotted on the same graph against the same time scale is the "pumping state" which indicates whether the cryogenic pump piston is extending to pump the cryogenic fluid or retracting to draw cryogenic fluid into the pump chamber during an intake stroke. A value of 1 is assigned to the pumping state when the cryogenic pump piston is extending and a value of 2 is assigned to the pumping state when the cryogenic pump piston is retracting. In the illustrated example, the cryogenic pump is a single-acting pump and the peak hydraulic fluid pressure is reached during the extension stroke, when the cryogenic fluid is being compressed and discharged from the cryogenic pump. In this graph the plotted hydraulic system pressure illustrates the normal pattern for the hydraulic fluid pressure when the pump chamber is fully charged during each intake stroke.

Figure 8:
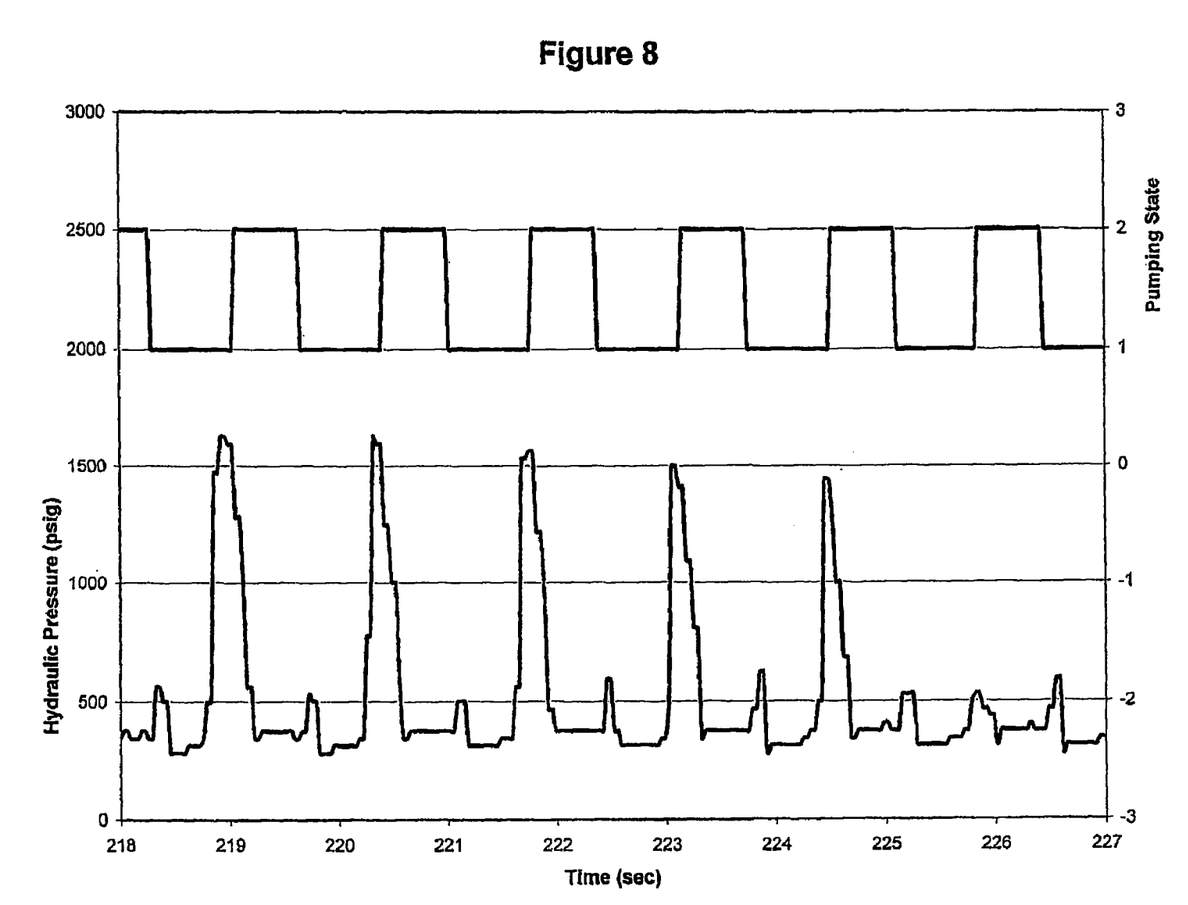
FIG. 8 is a graph that plots hydraulic fluid pressure measurements and pump piston displacement over time for a pump that is pumping a fluid from a storage vessel that is close to being empty.

FIG. 8 is another graph of hydraulic fluid pressure plotted against time. In this graph the peak hydraulic fluid pressure for successive pump cycles is declining, indicating that pump chamber is not being fully charged and less work is being done by the hydraulic drive unit, indicating that the storage vessel is close to being empty. FIGS. 7 and 8 show the difference between the shape of the plotted hydraulic fluid pressure measurements over time, when the cryogenic pump chamber is being fully charged versus when it is not being fully charged, illustrating how the disclosed method can monitor peak hydraulic fluid pressure as an indicator of when a storage vessel is nearly empty, and then empty.

In the described embodiments, as an alternative to using peak hydraulic fluid pressure measurements to determine when a storage vessel is empty, the electronic controller can compute the area beneath the plot of hydraulic fluid pressure measurements over time for each discrete pump cycle. The method is substantially the same, with the electronic controller determining that the storage vessel is empty if the computed area is less than a predetermined value for a predetermined number of pump cycles.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for delivering a process fluid comprising:
   (a) a storage vessel defining a storage space for storing said process fluid;
   (b) a process pump with a suction inlet in communication with said storage space;
   (c) a hydraulic drive system comprising a hydraulic drive unit operatively connected to drive said process pump and conduits for circulating and draining a pressurized hydraulic fluid to and from said hydraulic drive unit;
   (d) a pressure sensor for measuring hydraulic fluid pressure of said pressurized hydraulic fluid in said hydraulic drive system; and
   (e) an electronic controller programmed to:
      (i) monitor a signal representative of hydraulic fluid pressure that is measured by said pressure sensor;
      (ii) process said signal to determine when said storage vessel is empty by determining when a predetermined parameter is less than a predetermined threshold value; and
      (iii) stop said process pump when said storage vessel is empty.

2. The apparatus of claim 1 wherein said storage space is thermally insulated to define a cryogen space that can store said process fluid at a cryogenic temperature.

3. The apparatus of claim 1 wherein said process pump is a positive displacement pump.

4. The apparatus of claim 1 wherein said process pump further comprises a piston that is reciprocable to pump said process fluid.

5. The apparatus of claim 1 wherein for each cycle of said process pump, said electronic controller is programmable to process said measured hydraulic fluid pressure to determine a peak hydraulic fluid pressure, to compare said measured peak hydraulic fluid pressure to a predetermined value, to count the number of process pump cycles (n) when said measured peak hydraulic fluid pressure is less than said predetermined value, and to determine that said storage vessel is empty when n equals a predetermined number ($n_e$).

6. The apparatus of claim 5 further comprising a signaling device operable by said electronic controller to warn an operator of said apparatus when said electronic controller determines that process fluid level inside said storage vessel is low.

7. The apparatus of claim 6 wherein said electronic controller is programmable to determine that process fluid level inside said storage vessel low when said measured peak hydraulic fluid pressure is less than said predetermined value and n is greater than zero and less than $n_e$.

8. The apparatus of claim 1 wherein for each cycle of said process pump, said electronic controller is programmable to calculate an area beneath a plot of hydraulic fluid pressure measurements over time, to count the number of process pump cycles (n) when said area is calculated to be less than a predetermined value, and to determine that said storage vessel is empty when n equals a predetermined number ($n_e$).

9. The apparatus of claim 8 further comprising a signaling device that is operable by said electronic controller to warn an operator of said apparatus when said electronic controller determines that process fluid level inside said storage vessel is low.

10. The apparatus of claim 9 wherein said electronic controller is programmable to determine that process fluid level inside said storage vessel is low when said area is calculated to be less than said predetermined value and n is greater than zero and less than $n_e$.

11. The apparatus of claim 1 wherein said storage vessel is one of a plurality of storage vessels and piping connects said suction inlet of said process pump with each one of said plurality of storage vessels, and at least one valve associated with said piping is operable to select one of said storage vessels to be in fluid communication with said suction inlet of said process pump, and to stop communication with each one of said plurality of storage vessels when said controller determines that it is empty.

12. The apparatus of claim 1 wherein said storage vessel is one of a plurality of storage vessels, and said process pump is one of a plurality of process pumps, with each one of said storage vessels having one of said process pumps with a suction inlet disposed in their respective storage spaces and a respective hydraulic drive unit operable to drive each one of said process pumps, wherein said electronic controller monitors peak hydraulic fluid pressure for each one of said hydraulic drive units, and said electronic controller is programmable to shut down each and every one of said process pumps if its associated storage vessel is determined to be empty.

13. The apparatus of claim 12 wherein said hydraulic drive system comprises a hydraulic pump that is connectable by supply conduits to each one of said hydraulic drive units for said plurality of process pumps.

14. The apparatus of claim 13 wherein said pressure sensor is disposed in a conduit between a hydraulic fluid discharge of said hydraulic pump and a first switching valve for diverting flow to and from each one of said plurality of hydraulic drive units for respective ones of said process pumps.

15. The apparatus of claim 1 wherein said storage vessel is one of two storage vessels, and each one of said storage vessels has a process pump with a suction inlet disposed in their respective storage spaces and a respective hydraulic drive unit operable to drive each of said process pumps, wherein said electronic controller monitors peak hydraulic fluid pressure for each one of said hydraulic drive units, and said electronic controller is programmable to shut down either one or both of said process pumps if said electronic controller determines that said storage vessel associated with said process pump is empty.

16. The apparatus of claim 15 wherein said process pumps comprise double-acting pistons that are reciprocable within a pump chamber to pump said process fluid.

17. The apparatus of claim 15 wherein said pressure sensor is disposed in a conduit between a hydraulic fluid discharge of said hydraulic pump and a switching valve for diverting hydraulic fluid flow to and from said hydraulic drive units for said two process pumps.

18. The apparatus of claim 1 wherein said storage vessel is a fuel tank on board a vehicle that stores a fuel that is consumable by the vehicle's engine.

19. The apparatus of claim 2 wherein said process fluid comprises at least one of methane and hydrogen.

20. The apparatus of claim 1 wherein said process pump is disposed in said storage space and is connected by a drive shaft to said hydraulic drive unit, which is located outside of said storage space.

21. A method of detecting when a storage vessel for a process fluid is empty comprising:
  (a) storing said process fluid inside a storage space defined by said storage vessel;
  (b) pumping said process fluid from said storage space with a process pump driven by a hydraulic drive system that delivers a pressurized hydraulic fluid to a hydraulic drive unit from a hydraulic pump;
  (c) measuring hydraulic fluid pressure in said hydraulic drive system;
  (d) processing measured hydraulic fluid pressure to determine when said storage vessel is empty by determining when a predetermined parameter is less than a predetermined threshold value; and
  (e) stopping said process pump when said storage vessel is empty.

22. The method of claim 21 wherein said method of determining that said storage vessel is empty comprises detecting a peak hydraulic fluid pressure from said measured hydraulic fluid pressure for each process pump cycle and determining when it is less than said predetermined value, which is less than a predetermined normal peak hydraulic fluid pressure.

23. The method of claim 22 further comprising filtering from determination of said peak hydraulic fluid pressure, hydraulic fluid pressure measurements from the first part of each stroke of a hydraulic piston of said hydraulic drive unit.

24. The method of claim 22 further comprising counting the number of process pump cycles (n) that said peak hydraulic fluid pressure is less than said predetermined value and determining that said storage vessel is empty when a predetermined number of process pump cycles ($n_e$) are counted.

25. The method of claim 24 wherein if n is positive, said method further comprises subtracting one from n for each subsequent process pump cycle in which peak hydraulic fluid pressure is greater than said predetermined value.

26. The method of claim 24 further comprising sending a warning signal to an operator of said process pump when n is greater than zero and less than $n_e$.

27. The method of claim 24 further comprising sending a signal to an operator of said process pump indicating that said storage vessel is empty when n equals $n_e$.

28. The method of claim 21 wherein said method of determining that said storage vessel is empty comprises calculating an area beneath a plot of hydraulic fluid pressure measurements over time and determining when said calculated area is less than said predetermined value, which is less than a predetermined normal area.

29. The method of claim 28 further comprising counting the number of process pump cycles (n) that said calculated area is less than said predetermined value and determining that said storage vessel is empty when a predetermined number of process pump cycles ($n_e$) are counted.

30. The method of claim 29 wherein if n is positive, said method further comprises subtracting one from n for each subsequent process pump cycle in which said calculated area is greater than said predetermined value.

31. The method of claim 29 further comprising sending a warning signal to an operator of said process pump when n is greater than zero and less than $n_e$.

32. The method of claim 29 further comprising sending a signal to an operator of said process pump indicating that said storage vessel is empty when n equals $n_e$.

33. The method of claim 21 wherein said storage vessel is one of a plurality of storage vessels and said method further comprises ceasing to pump process fluid from one of said plurality of storage vessels when it is determined to be empty, and pumping said process fluid from another one of said plurality of storage vessels until each one of said plurality of storage vessels is determined to be empty.

34. The method of claim 33 further comprising counting for each of said plurality of storage vessels the number of process pump cycles (n) that a respective peak hydraulic fluid pressure determined from said measured hydraulic fluid pressure, is less than said predetermined value, and determining that each one of said storage vessels is empty when n for a respective storage vessel equals a predetermined number of process pump cycles ($n_e$).

35. The method of claim 33 further comprising counting for each of said plurality of storage vessels the number of process pump cycles (n) that a respective calculated area beneath a plot of hydraulic fluid pressure measurements over time is less than said predetermined value, and determining that each one of said storage vessels is empty when n for a respective storage vessel equals a predetermined number of process pump cycles ($n_e$).

36. The method of claim 21 further comprising detecting a beginning or end of a process pump cycle by processing measured hydraulic fluid pressure, and using said detected beginning or end to separate said measured hydraulic fluid pressure into discrete measurements for respective process pump cycles.

37. The method of claim 21 further comprising detecting a beginning or end of a process pump cycle by processing a signal from a position sensor associated with said hydraulic drive unit or a drive shaft between said hydraulic drive unit and said process pump, and using said detected beginning or end to separate said measured hydraulic fluid pressure into discrete measurements for respective process pump cycles.

38. The method of claim 21 further comprising detecting a beginning of a process pump cycle by detecting when a valve is actuated for switching the flow direction of hydraulic fluid through said hydraulic drive unit.

39. The method of claim 21 wherein said process fluid is a gas at ambient temperature and pressures and is stored inside said storage space in the form of a liquefied gas.

40. The method of claim 39 wherein said process fluid is stored inside said storage space at a cryogenic temperature.

* * * * *